Oct. 25, 1966    F. BARANOWSKI, JR    3,281,090
RECORDING DEVICE

Filed Sept. 3, 1963    2 Sheets-Sheet 1

INVENTOR.
FRANK BARANOWSKI JR.
BY
W. J. Shanley Jr.
HIS ATTORNEY

Oct. 25, 1966  F. BARANOWSKI, JR  3,281,090
RECORDING DEVICE

Filed Sept. 3, 1963  2 Sheets-Sheet 2

*INVENTOR.*
FRANK BARANOWSKI JR.
BY
W. J. Shanley Jr.
HIS ATTORNEY

//  # United States Patent Office 3,281,090
Patented Oct. 25, 1966

3,281,090
RECORDING DEVICE
Frank Baranowski, Jr., Lynnfield Center, Mass., assignor to General Electric Company, a corporation of New York
Filed Sept. 3, 1963, Ser. No. 306,122
11 Claims. (Cl. 242—67.3)

This invention relates to strip chart recorders, and more particularly concerns improvements in the mechanism for controlling the movement of the strip chart in such recorders.

Strip chart recorders conventionally comprise a timing drum with sprockets for engaging perforations in the strip chart, a supply roll of strip chart paper, and a reroll drum for rerolling the chart paper after the recording has been received thereon. In order to maintain tension upon the chart paper as it is being rerolled upon the reroll drum, it has been necessary to frictionally drive the reroll drum to accommodate the changing circumference of the reroll drum as the strip chart is wound upon it. It is also necessary to support the reroll drum in such a way as to facilitate the easy removal of the rerolled chart paper from the reroll drum. In accordance with prior art techniques, the requirements for frictionally driving the reroll drum, as well as conveniently supporting it so as to permit its easy removal, has resulted in relatively complex and cumbersome supporting and drive structure.

Therefore a feature of my invention is an improved system for controlling the relative motion between the timing and reroll drums of a strip chart recorder, as well as simplified means for removably supporting the reroll drum.

It has been found to be highly desirable in certain applications to be able to frequently inspect the portion of the strip chart already rolled upon the reroll drum. In some prior art recorders it is necessary to remove the reroll drum from the recorder in order to inspect the strip chart, thus necessitating the rewinding of the chart paper by hand prior to the reinsertion of the reroll drum into the recorder. This is an extremely cumbersome and slow operation and, consequently, does not lend itself to applications requiring frequent inspections of the strip chart.

In other prior art systems provisions are made for retaining the reroll drum in the recorder during the time that the strip chart is being inspected. Such systems also have provisions for manually engaging a reroll spring with the reroll drum so that the spring is wound up when the reroll drum is being rotated in response to the removal of the strip chart from the reroll drum for inspection purposes. Upon release of the strip chart, the reroll drum is rotated by the reroll spring until the strip chart paper is again rewound upon the reroll drum. Manually engaged rewind systems have been found to require close attention by the operator to make sure that the reroll spring is manually engaged prior to the inspection of the strip chart since failure to engage the spring will prevent it from storing enough energy to permit it to completely rewind the strip chart after the inspection has taken place. It would thus be highly desirable to provide reroll means that are automatically engaged when the chart is pulled out for inspection so as to facilitate the complete rewinding of the strip chart upon completion of the inspection operation. Furthermore, the reroll drum must be supported so as to prevent it from being accidentally pulled out of the recorder when the strip chart is pulled out for inspection, without interfering with its easy removability.

Another feature of my invention is provided by means which are automatically engageable for rerolling a strip chart which has been pulled from the reroll drum for inspection.

Still another feature of my invention is a multi-speed strip chart recorder utilizing a multiplicity of substantially identical motor assemblies which are conveniently arranged in a stacked configuration in which the output shafts of the assemblies are directly connected together. The stacked configuration of the motor assemblies provides a more flexible strip chart recorder in that the number of chart speeds available, as well as the magnitudes of the individual chart speeds, may be easily changed in the field thus providing an extremely flexible design which is economical to construct and flexible in performance.

It is another feature of this stacked configuration that the unenergized motor assemblies be decoupled from the energized timing motor thus reducing the drag on the energized timing motor. This permits the utilization of smaller and less expensive timing motors. In addition, it is another feature of this design that when the timing drum is manually rotated for timing purposes all of the timing motor assemblies are decoupled from the timing drum so as to permit the unhindered rotation of the timing drum in its forward direction. While strip chart recorders constructed in accordance with the prior art have sometimes incorporated single features similar to those enumerated above, none of the prior art devices have successfully managed to produce a strip chart recorder which encompasses two or more of the features in combination. Attempts in the prior art to accomplish such a combination of features have usually resulted in cumbersome, complicated strip chart recorders.

Therefore, it is an object of this invention to provide a strip chart recorder which is constructed to provide at least two of the above-mentioned features.

Still another object of this invention is to provide a strip chart recorder characterized by having a reroll spool which is capable of being easily removed from the strip chart recorder and by having means registering the chart with clock time without stopping chart operation.

Yet another object of this invention is to provide a strip chart recorder wherein easy reroll spool drum removal and easy timing procedures are combined with an inspection feature whereby the reroll drum automatically rewinds the strip chart after inspection.

Still another object of this invention is to provide a strip chart recorder characterized by ease of reroll drum removal and timing in combination with dual speed operation so that the drag exerted on the timing motor which is energized is substantially minimized.

Still another object of this invention is to provide a strip chart recorder which can be constructed so as to incorporate all of the above-mentioned features.

In carrying out my invention in its preferred form, each timing motor assembly comprises a timing motor, speed reducing means, and an overriding clutch for driving the output shaft of the assembly, the output shaft being connected to a gear train which directly drives the timing drum while frictionally driving the reroll drum. The necessary frictional drag is placed upon the strip chart being wound upon the reroll drum due to the fact that the reroll drum is slightly larger in circumference than the timing drum, both drums being coupled to gears that revolve at the same speed. This assures that the strip chart will be taken up by the reroll drum faster than it can be paid out by the timing drum.

In accordance with the invention, the frictional coupling between the gear train and the reroll drum is provided by the frictional contact between a cylindrical boss which is directly connected to the gear train and a mating cylindrical cutout portion or recess in the end of the reroll drum. The boss and recess also provide means for supporting one end of the reroll drum when they are in their cooperative relationship.

Automatic rewind of the reroll drum is provided, in accordance with the invention, by directly gearing the reroll drum to a spiral spring through a one-way or overrunning clutch which is arranged to wind up the spring when the reroll drum is paying-out the strip chart. Thus, upon release of the strip chart after the inspection has been completed the reroll spring will automatically rotate the reroll drum in a direction to rewind the strip chart upon the reroll drum. The unrolling and rerolling of the reroll drum while the timing motor is de-energized is rendered possible by the slippage in the frictional coupling between the reroll drum and gear train.

In accordance with the invention, the timing motor assemblies are arranged in stacked configuration with the output shafts, both ends of which are available, being directly coupled together in coaxial alignment. This permits the keying of the output shaft of a motor assembly to the output shafts of the adjacent motor assemblies.

The foregoing objects, as well as such other and further objects and advantages as may become apparent hereinafter, are accomplished in a particularly effective manner by the specific preferred embodiment of this invention illustrated in the accompanying drawings and described in the following detailed description.

Figures 3, 4:
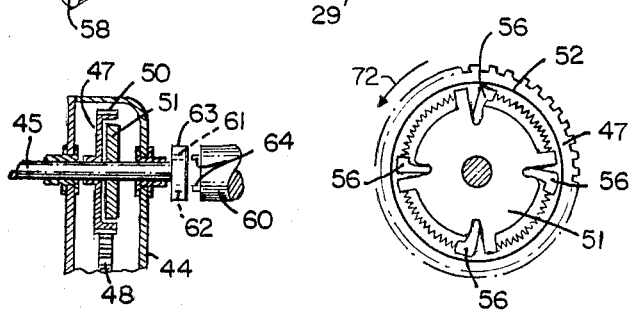
FIG. 3 is a sectional view showing a portion of a timing motor assembly and the manner of coupling together the output drive shafts of two timing motor assemblies.
Figure 8:
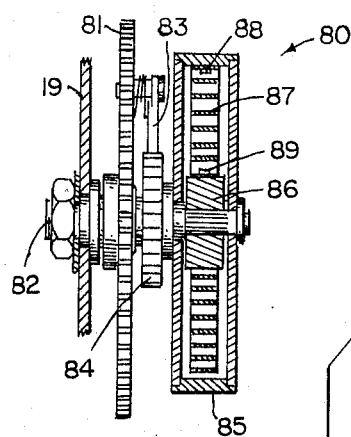
Figure 5:
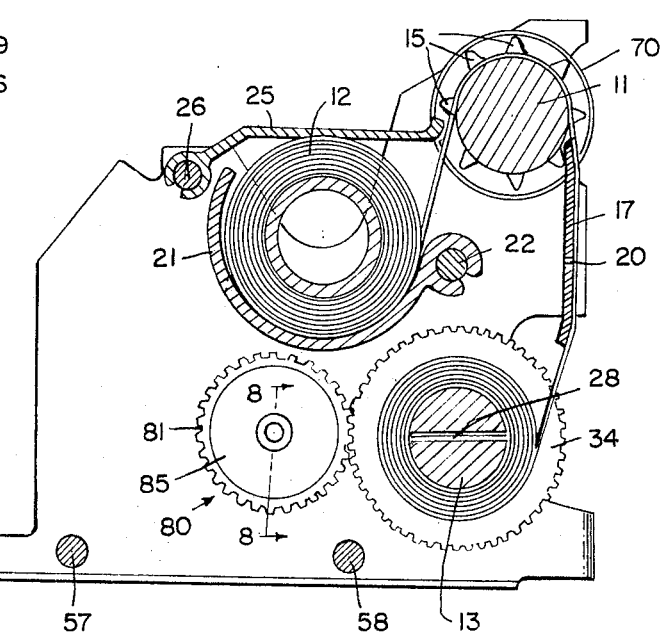
Figure 6:
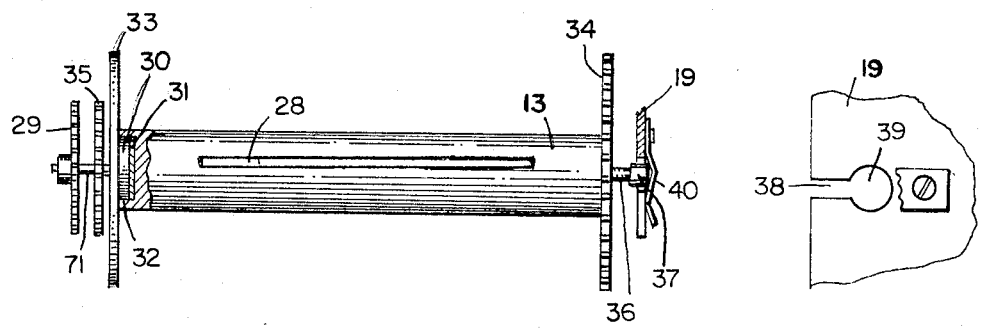
Figure 7:
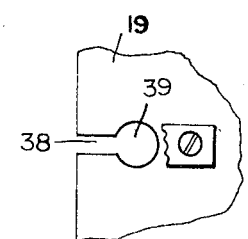

FIG. 4, taken in connection with FIG. 3, discloses the details of an overriding clutch which may be utilized for connecting the speed reducing gear train to the output shaft of the motor assembly;

FIG. 5 is a cross-sectional view of the recorder looking toward the end of the recorder having the automatic rewind structure;

FIG. 6 is a partially-sectioned plan view of the reroll drum showing the details of the slip clutch as well as the manner in which the opposite end of the reroll drum is supported;

FIG. 7, taken in conjunction with FIG. 6, provides an elevational view of a portion of a supporting side plate showing the manner in which that end of the reroll drum is supported; and FIG. 8 is a sectional view taken along lines 8—8 of FIG. 5.

Referring now more in detail to the drawings in which like reference characters are utilized to designate like parts throughout, the apparatus consists of a timing drum 11, a supply roll 12, and a reroll drum 13 which carry a record chart 14 in strip form. It will be recognized that a suitable movable pen or marking device will be conventionally employed in cooperation with timing drum 11 and strip chart 14 in order to form a complete recording instrument. The movable marking device is not illustrated since it does not form a part of the present invention.

It will be understood that writing table 17 is supported between side plates 18 and 19 in a position to permit notations to be placed on the strip chart by the operator. Slot 20 in table 17 is provided to facilitate the cutting of the strip chart, as is well known in the art.

Figure 1:
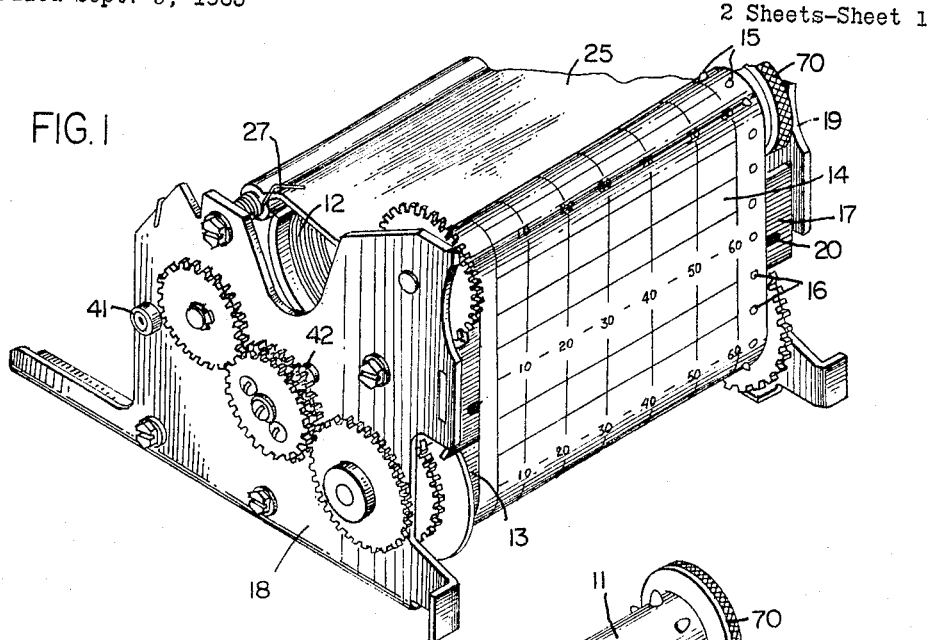
FIG. 1 is a perspective view of the strip chart recording device embodying this invention.
Figure 2:
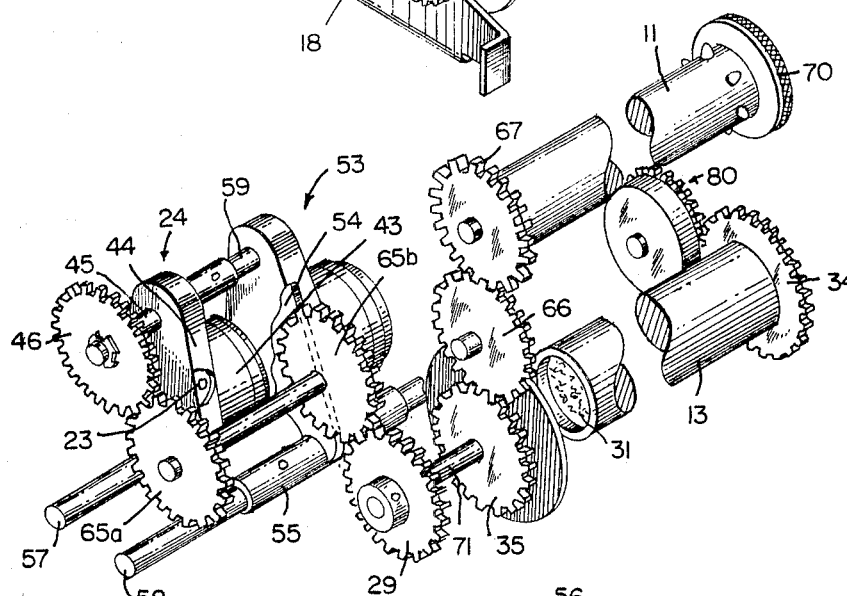
FIG. 2 is an exploded perspective view of the gear train with the supporting side plates omitted for clarity of presentation.

Referring now in particular to FIGS. 1, 2 and 5, sprockets 15 upon timing drum 11 provide means which cooperate with evenly spaced perforations 16 in moving strip chart 14 for accurately controlling the movement of the strip chart in accordance with the rotation of timing drum 11.

Supply roll 12 is conveniently supported in the position illustrated in FIG. 5 by the concave upper surface of curved plate 21 pivotally supported on shaft 22. Shaft 22 is in turn supported between the side plates 18 and 19. Plate 21 is located in the position illustrated in FIG. 5 by coming into contact with an exterior surface of fan-shaped housing 44 of motor assembly 24. Plate 25, pivotally supported upon shaft 26 between side plates 18 and 19, is resiliently urged against the top of supply roll 12 by spring 27 so as to introduce the required friction between plate 21 and supply roll 12. This places sufficient tension upon strip chart 14 to assure that perforations 16 will properly seat in sprockets 15.

This construction also facilitates the changing of supply roll 12, it being necessary merely to raise plate 25, remove the old supply roll and drop the new supply roll into the trough formed by plate 21. The strip chart 14 may then be placed over timing drum 11 in such a position as to bring sprockets 15 and perforations 16 into registry. Plate 25 may then be released to apply the required tension to the strip chart. The leading edge of strip chart 14 may then be secured to reroll drum 13 in any convenient manner. For example, slit 28 (see FIG. 6) is provided to receive the leading edge of strip chart 14.

Referring now to FIG. 6, reroll drum 13, supported for rotation between side plates 18 and 19, is rotated in response to the rotation of gear 29 since means is provided by shaft 71, boss 30, disk 31 and recess 32 to frictionally couple gear 29 to reroll drum 13. The friction is developed between the planar end surface of cylindrical element 30 and disk 31 which is secured to the bottom of cup-shaped recess 32. Gear 34, which rotates with drum 13, and hub 33 cooperate to provide means for guiding strip chart 14 as it is wound upon reroll drum 13. Shaft 71, rotatably supported by side plate 18, also carries gear 35 which is secured to rotate with shaft 71 in response to the rotation of drive gear 29.

Referring now to FIGS. 6 and 7, the opposite end of reroll drum 13 is rotatably supported through the cooperation between enlarged portion 37 of shaft 36 which is received in the enlarged bottom 39 of slot 38. Shaft 36 and reroll drum 13 are maintained in the position illustrated in FIG. 6 due to the axial force exerted by a resilient means such as a spring 40 upon the end of portion 37. Spring 40 also provides the force necessary to develop the desired pressure between boss 30 and disk 31 for the proper operation of the clutch formed by these elements. The clutch has been found to operate effectively when disk 31 is made of cork and spring 40 has been selected to exert the proper pressure upon the clutch forces.

The entire reroll drum assembly may be removed from the carriage by overcoming the force applied by spring 40 to permit the reroll drum to move to the right, as viewed in FIG. 6, so that shaft 36 is free to move out through slot 38. This movement also frees the other end of reroll drum 13 so that recess 32 now clears cylindrical element 31.

Motor assembly 24, secured to side plate 18 by mounting screws 41 and 42, tab 23 and a hidden tab, is comprised of a cylindrical portion 43 for housing a constant speed motor and a fan-shaped portion 44 which houses a speed-reducing gear train and an overriding clutch 47.

Referring now to FIGS. 3 and 4, the output gear 48 of the speed-reducing gearing is coupled through overriding clutch 47 to output shaft 45 which carries gear 46. Clutch 47 comprises a sleeve member 50 rotatably supported upon shaft 45 so that the teeth in its external peripheral surface will mesh with output gear 48 of the speed-reducing means and plate 51 which is secured to rotate shaft 45. Plate 51 is shaped so as to pivotally carry four spring biased dogs 56 which cooperate with inner peripheral surface 52 of sleeve member 50 so as to drive output shaft 45 when sleeve 50 is driven in the direction of arrow 72 by speed-reducing gear 48. The motor of this assembly is coupled to gear 48 so as to drive member 50 in the direction of arrow 72 when it is energized. Clutch 47 also permits the adjustment of the timing of the recorder by permitting strip chart 14 to be manually advanced while the motor of motor assembly 24 is de-energized since it serves to decouple the timing motor and speed-reducing gear 48 from shaft 45.

Referring now to FIG. 2, timing motor assembly 53, which is provided to obtain a second chart speed, is illustrated as being supported in stacked relationship with respect to timing motor assembly 24 by being supported upon plate 54 in the same manner as motor assembly 24 is supported by side 18. This plate is supported in the illustrated position between cylindrical portion 43 of assembly 24 and the fan-shaped housing of assembly 53 by being secured to two sleeves which are carried by shafts 57 and 58. One sleeve, i.e., sleeve 55, is illustrated in FIG. 2 as being mounted on shaft 58. The lengths of these sleeves may be conveniently selected so as to provide the proper spacing between motor assemblies 24 and 53 when they are advanced until their ends come in contact with plate 18.

Provisions are made to couple output shaft 59 of motor assembly 53 to output shaft 45 of motor assembly 24 by keying sleeve 60 to shaft 45, sleeve 60 being slidably received on shaft 59 and secured thereto in any convenient manner. It has been found convenient to key sleeve 60 to output shaft 45 by providing apertures 61 and 62 in disk 63 and corresponding pins 64 upon sleeve 60 which will mate when motor assembly 53 is advanced into contact with plate 18. Thus, in accordance with the invention, if motor assembly 53 is energized, its output shaft 59 is coupled to output gear 46 through output shaft 45 of motor assembly 24. As was previously indicated, under these conditions overriding clutch 47 of assembly 24 serves to decouple speed-reducing gear 48 and, consequently, it will decouple the motor of assembly 24 from shaft 59. In this way motor assembly 53 drives output gear 46 only, it being decoupled from unenergized motor assembly 24.

As can be seen in FIG. 2, output gear 46 drives gear 29 and gear 35 through idler gears 65a and 56b which are shown in the separated position for clarity of illustration. As was previously indicated, gear 35 is frictionally coupled to reroll drum 13 through the slip clutch while it is also coupled through idler gear 66 to gear 67 which is secured to timing drum 11. Thus, output gear 46 is frictionally coupled to reroll drum 13 and directly coupled to timing drum 11 to provide the required movement of strip chart 14 under control of timing drum 11.

Knurled wheel 70, which is secured to timing drum 11, is provided so as to permit the manual advancement of strip chart 14 for timing purposes. As previously indicated, the rotation of timing drum 11 during the timing operation is permitted since motor assembly output gear 46 is free to rotate in response to the rotation of gear 67 since shaft 45 is decoupled from the motor assemblies by their overriding clutches. Thus, the overriding clutches of the timing motor assemblies serve a dual function of permitting the direct connection of the output shafts of selectively energizable motor assemblies as well as permitting the adjustment of the timing of the recorder.

Gear 34, which is secured to rotate with reroll drum 13, cooperates with automatic reroll assembly 80 to provide means for automatically rerolling strip chart 14 upon reroll drum 13 when it has been released after inspection.

Referring now to FIG. 8, automatic reroll assembly 80 is illustrated as comprising gear 81 rotatably supported upon shaft 82 so as to mesh with gear 34 so as to rotate whenever reroll drum 13 is rotating. Thus, spring mounted dog 83 carried by gear 81 will continuously rotate in cooperative relationship with ratchet wheel 84 which is rotatably supported upon shaft 82 and secured to housing 85, the spring-loaded dog 83 and the ratchet wheel 84 constituting an overrunning clutch means. Collar 86 and stud 89, which are secured to shaft 82, provide means for securing one end of spiral spring 87 to shaft 82 while the other end of spring 87 is secured to rotatable housing 85 by stud 88.

Ratchet wheel 84 is arranged to cooperate with spring bias dog 83 so that spring 87 is wound about collar 86 whenever reroll drum 13 is being rotated in a direction to pay out strip chart 14. However, when reroll drum 13 is being rotated in the direction to wind up strip chart 14, ratchet wheel 84 will remain stationary and reroll spring 87 will remain in its unwound condition. Thus, if strip chart 14 is grasped and pulled from reroll drum 13, dog 83 will couple this motion to ratchet wheel 84 so as to wind reroll spring 87. Spring 87 should be strong enough to accomplish the rerolling of the strip chart paper upon the reroll drum while overcoming the friction in the slip clutch formed by cylindrical element 30 and friction disk 31.

While there has been described what is at present considered to be a preferred embodiment of the invention, it will be apparent to those skilled in the art that various changes and modifications may be made therein without departing from the spirit or scope of the invention.

What I claim as new and desire to secure by Letters Patent of the United States is:

1. In a strip chart recorder including a support means, a record chart in strip form, a timing drum mounted on said support means for controlling the advance of the strip chart, a timing motor, means for connecting the timing motor and timing drum to drive the timing drum in response to rotation of the timing motor, and a reroll drum for receiving the strip chart, the improvement comprising:

(a) a slip clutch for coupling one end of said reroll drum to said driving means to be driven and supported thereby including:
 (i) a cup-shaped element having a planar portion,
 (ii) a cylindrical element having a planar end face formed for engagement with said cup-shaped member planar portion, one of said elements being integral with said reroll drum, and
 (iii) resilient means on said support means, said support means having a slot formed therein to support the other end of said reroll drum, said resilient means urging said reroll drum toward said one end so that said cylindrical element is retained by said cup-shaped member, when said reroll drum is in place, the pressure necessary for the proper functioning of said clutch being supplied by said resilient means, said one end of said reroll drum being supported when said elements are mated together, said reroll drum being coupled to said driving means such that when said timing motor is operating, said clutch being caused to slip because the strip chart cannot be paid-out by said timing drum as fast as said reroll drum is capable of rerolling it, said support means and said resilient means supporting said reroll drum so that said slip clutch elements can be separated and said other end can be removed from said slot in said support means so that said reroll drum is easily removable from said recorder, (b) manual chart advance means including;
 (i) means on said timing drum for manually timing said timing drum by advancing said strip chart, said strip chart being taken upon said reroll spool by means of said slip clutch, and
 (ii) overriding clutch means coupling said timing motor to said slip clutch, said overriding clutch decoupling said timing motor from said timing drum when said timing motor turns at a rate slower than that imparted to said timing drum by the manual advance.

2. The combination of claim 1 wherein said other end of said reroll drum is supported for rotation upon a shaft having an enlarged cylindrical portion that mates with an enlarged bottom portion of said slot in said support means, the end of said shaft being in contact with said resilient means so that the enlarged portion of said shaft will mate with the enlarged portion of said slot when said cylindrical element is received in said cup-shaped element whereby both ends of said reroll drum may be freed from their supports by advancing said shaft against said resilient means so as to allow said cylindrical portion of the shaft to move out of said enlarged portion of the slot so as to permit the movement of the shaft out of said slot to free said other end of said reroll drum, said one end being freed by moving said cylindrical element out of said cup-shaped element.

3. The combination of claim 1 further comprising means coupled to said reroll drum for automatically rerolling said strip chart upon said reroll drum whenever it is released after having been previously unrolled for inspection, said clutch being caused to slip during the unrolling and rerolling of said strip chart, thus permitting the inspection.

4. The combination of claim 3 in which said automatic rerolling means comprises an overrunning clutch and resilient torquing means coupled to said reroll drum by said overrunning clutch so as to store energy therein as the strip chart is unrolled from said reroll drum, said stored energy being sufficient to reroll the strip chart on said reroll drum against the friction of said slip clutch as it is released upon completion of its inspection.

5. The combination of claim 4 in which reroll drum is geared to said overrunning clutch by the meshing of a first gear at said other end of said reroll drum with a second gear connected to said overrunning clutch.

6. The combination of claim 5 in which said resilient means comprises a spring arranged in a spiral configuration within a cylindrical housing, one end of said spring being connected to the housing and the other end being connected to a fixed shaft, said housing being rotatable when it is connected to said second gear by said overrunning clutch.

7. The combination of claim 6 in which said overrunning clutch comprises a spring-loaded dog supported to cooperate with a ratchet wheel, said spring-loaded dog being carried by said second gear, said ratchet wheel being connected to said housing to cause it to rotate when said ratchet wheel is rotated.

8. The combination of claim 7 in which said timing drum and the portion of said slip clutch connected to said driving means are rotated at the same speed, said reroll drum having a slightly larger circumference than said timing drum whereby said clutch is caused to slip when said timing and reroll drums are driven by said driving means.

9. In a strip chart recorder including a support means, a record chart in strip form, a timing drum mounted on the support means for controlling the advance of the strip chart and a reroll drum for receiving the strip chart, the improvement comprising:
(a) a plurality timing motor drive means for driving said timing drum, each of said drive means including:
  (i) a timing motor,
  (ii) speed reducing means connected to said timing motor,
  (iii) an output shaft,
  (iv) overriding clutch means coupling said speed reducing means to said output shaft when said speed reducing means speed tends to exceed the speed of said output shaft,
(b) first means connecting said output shafts of said plurality of timing motor drive means in coaxial alignment, and
(c) second means connecting one of said output shafts to said timing drum,
(d) a slip clutch for coupling one end of said reroll drum to said second connecting means to be driven and supported thereby including:
  (i) a cup-shaped element having a planar portion,
  (ii) a cylindrical element having a planar end face formed for engagement with said cup-shaped member planar portion, one of said elements being integral with said reroll drum, and
  (iii) resilient means on said support means, said support means having a slot formed therein to support the other end of said reroll drum, said resilient means urging said reroll drum toward one end so that said cylindrical element is retained by said cup-shaped member when said reroll drum is in place, the pressure necessary for the proper functioning of said clutch being supplied by said resilient means, said one end of said reroll drum being supported when said elements are mated together, said reroll drum being coupled to said second connecting means, when said timing motor is operating, said clutch being caused to slip because the chart cannot be paid out by said timing drum as fast as said reroll drum is capable of rerolling it, said support means and said resilient means supporting said reroll drum so that said clutch elements can be separated and said other end can be removed from said slot in said support means to thereby allow easy removal of said recorder, and
(e) a manual chart advance means including means for manually turning said timing drum to advance said strip chart, said strip chart being taken up on said reroll spool by means of said slip clutch, and said overriding clutch, said overriding clutch decoupling said timing motor from said timing drum when said timing motor turns at a rate slower than that imparted to said timing drum by the manual advance.

10. A strip chart recorder as recited in claim 9 additionally including automatic rerolling means comprising an overrunning clutch and resilient torquing means coupled to said reroll drum, and said support means including a housing, a gear for engaging said timing drum, a spring-loaded dog supported to cooperate with a ratchet wheel, said spring-loaded dog being carried by said gear, said ratchet wheel being connected to said housing to cause it to rotate when the ratchet wheel is rotated.

11. A strip chart recorder as recited in claim 10 in which said timing drum and the portion of said coupling means connected to said second connecting means are rotated at the same speed, said reroll drum having a slightly larger circumference than said timing drum whereby said clutch is caused to slip when said timing and reroll drums are driven by said driving means.

References Cited by the Examiner

UNITED STATES PATENTS

| | | | |
|---|---|---|---|
| 877,027 | 1/1908 | Weser | 242—68.4 |
| 1,014,680 | 1/1912 | Warner | 242—129.6 X |
| 2,012,437 | 8/1935 | Segal | 242—67.4 |
| 2,034,543 | 3/1936 | Twiss et al. | 242—67.2 |
| 2,059,879 | 11/1936 | La Pierre | 242—67.2 |
| 2,131,346 | 9/1938 | Fairchild. | |
| 2,796,317 | 6/1957 | Valenti et al. | 346—136 |
| 2,845,232 | 7/1958 | Johnson et al. | 242—67.2 |
| 2,938,948 | 5/1960 | Hell | 346—136 X |
| 3,009,665 | 11/1961 | Umrath | 242—67.3 X |
| 3,048,848 | 8/1962 | May. | |

FOREIGN PATENTS 384,651   3/1922   Germany.

STANLEY N. GILREATH, Primary Examiner.

G. F. MAUTZ, Examiner.